(12) United States Patent
Nadgowda (10) Patent No.: US 9,703,713 B2
(45) Date of Patent: Jul. 11, 2017

(54) SINGLETON CACHE MANAGEMENT PROTOCOL FOR HIERARCHICAL VIRTUALIZED STORAGE SYSTEMS

(71) Applicant: International Business Machines Corporation, Armonk, NY (US)

(72) Inventor: Shripad Jayant Nadgowda, Nagpur (IN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 14/634,033

(22) Filed: Feb. 27, 2015

(65) Prior Publication Data

US 2016/0253262 A1 Sep. 1, 2016

(51) Int. Cl.
*G06F 12/00* (2006.01)
*G06F 13/00* (2006.01)
*G06F 12/0831* (2016.01)
*G06F 12/0811* (2016.01)
*G06F 12/0897* (2016.01)

(52) U.S. Cl.
CPC ...... *G06F 12/0833* (2013.01); *G06F 12/0811* (2013.01); *G06F 12/0897* (2013.01); *G06F 2212/502* (2013.01); *G06F 2212/62* (2013.01)

(58) Field of Classification Search
CPC .......................... G06F 12/0811; G06F 12/0897
USPC ........................................................ 711/122
See application file for complete search history.

(56) References Cited

U.S. PATENT DOCUMENTS

| | | | | |
|---|---|---|---|---|
| 2003/0023814 A1* | 1/2003 | Barroso | ............... | G06F 12/0826 711/122 |
| 2004/0006672 A1* | 1/2004 | Civlin | ..................... | G06F 9/383 711/144 |
| 2006/0053215 A1* | 3/2006 | Sharma | ............... | G06F 21/6218 709/223 |
| 2012/0124305 A1* | 5/2012 | Weissman | ........... | G06F 12/0223 711/160 |
| 2013/0290595 A1* | 10/2013 | Weissman | ............... | G06F 17/30 711/6 |
| 2014/0237183 A1 | 8/2014 | Venkatesh et al. | | |
| 2014/0372700 A1* | 12/2014 | Whalley | ............. | G06F 12/0811 711/122 |
| 2015/0081979 A1* | 3/2015 | Banta | .................. | G06F 12/0804 711/135 |
| 2015/0378911 A1* | 12/2015 | Bradbury | ............ | G06F 12/0891 711/122 |
| 2016/0170885 A1* | 6/2016 | Salyers | ............... | G06F 11/1464 711/123 |

* cited by examiner

*Primary Examiner* — Sean D Rossiter
(74) *Attorney, Agent, or Firm* — Ference & Associates LLC (57) ABSTRACT

Methods and arrangements for providing cache management in a hierarchical virtualized storage system. A contemplated method includes: for each layer in the storage system, designating a relative position with respect to at least one other layer in the storage system; imparting a caching policy to be applied collectively to all layers, the caching policy being based on the relative position of each layer with respect to at least one other layer in the storage system; and upon an attempt to cache data in at least one of the layers, maintaining communication between the layers to permit application of the caching policy. Other variants and embodiments are broadly contemplated herein.

18 Claims, 7 Drawing Sheets

SINGLETON CACHE MANAGEMENT PROTOCOL FOR HIERARCHICAL VIRTUALIZED STORAGE SYSTEMS

BACKGROUND

As is generally known, virtualization and NAS (network-attached storage) are continuing to emerge as viable storage arrangements. Tiered storage has generally been giving way to a more complex system of storage stacks, wherein each stack includes isolated "storage layers".

In a conventional arrangement as just described, each storage layer manages its own cache independently. Thus, for a single I/O (input/output) path, there can easily result a condition of data duplication across multiple storage layers. Efficient cache management across one or more storage stacks thus becomes a highly elusive task.

BRIEF SUMMARY

In summary, one aspect of the invention provides a method of providing cache management in a hierarchical virtualized storage system with a plurality of layers each comprising caching space, the method comprising: utilizing at least one processor to execute computer code configured to perform the steps of: for each layer in the storage system, designating a relative position with respect to at least one other layer in the storage system; imparting a caching policy to be applied collectively to all layers, the caching policy being based on the relative position of each layer with respect to at least one other layer in the storage system; and upon an attempt to cache data in at least one of the layers, maintaining communication between the layers to permit application of the caching policy.

Another aspect of the invention provides an apparatus for providing cache management in a hierarchical virtualized storage system, the apparatus comprising: at least one processor; and a computer readable storage medium having computer readable program code embodied therewith and executable by the at least one processor, the computer readable program code comprising: computer readable program code configured, for each layer in the storage system, to designate a relative position with respect to at least one other layer in the storage system; computer readable program code configured to impart a caching policy to be applied collectively to all layers, the caching policy being based on the relative position of each layer with respect to at least one other layer in the storage system; and computer readable program code configured, upon an attempt to cache data in at least one of the layers, to maintain communication between the layers to permit application of the caching policy.

A further aspect of the invention provides a computer program product for providing cache management in a hierarchical virtualized storage system, the computer program product comprising: a computer readable storage medium having computer readable program code embodied therewith, the computer readable program code comprising: computer readable program code configured, for each layer in the storage system, to designate a relative position with respect to at least one other layer in the storage system; computer readable program code configured to impart a caching policy to be applied collectively to all layers, the caching policy being based on the relative position of each layer with respect to at least one other layer in the storage system; and computer readable program code configured, upon an attempt to cache data in at least one of the layers, to maintain communication between the layers to permit application of the caching policy.

An additional aspect of the invention provides a method comprising: for each layer in a hierarchical virtualized storage system storage system, designating a relative position with respect to at least one other layer in the storage system; imparting a caching policy to be applied collectively to all layers, the caching policy being based on the relative position of each layer with respect to at least one other layer in the storage system; and upon an attempt to cache data in at least one of the layers, maintaining communication between the layers to permit application of the caching policy; the imparting of a caching policy comprising: providing for caching data solely at a first layer upon a request to cache data, the first layer comprising a virtual machine layer, and an uppermost layer relative to other layers; and providing for applying a least recently used caching eviction policy with respect to a totality of caching space across all storage layers.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an exemplary embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, are methods and arrangements which provide a singleton, one-way cache management protocol in hierarchical virtualized storage systems. This can involve positioning and/or labeling each storage component in the stacked system, and making each component aware of its position. Based on its position, each storage component can then implement its own cache entry/exit policy, and this policy may be different from those of other storage components. Data deduplication in an I/O path (in a stacked storage system) can be involved here, where data end up being cached only at one storage layer. Additionally, whereas cache management of each storage component can be isolated or independent from that of other storage components, cache capacity can still be consolidated across all components and layers. Generally, cache deduplication may be targeted or configured not so much to reduce disk space, as to ensure that caches across storage systems in a hierarchical layout are used efficiently.

The features discussed above, and others, relating to at least one embodiment of the invention, will be better appreciated from the discussion which follows.

Figure 1:
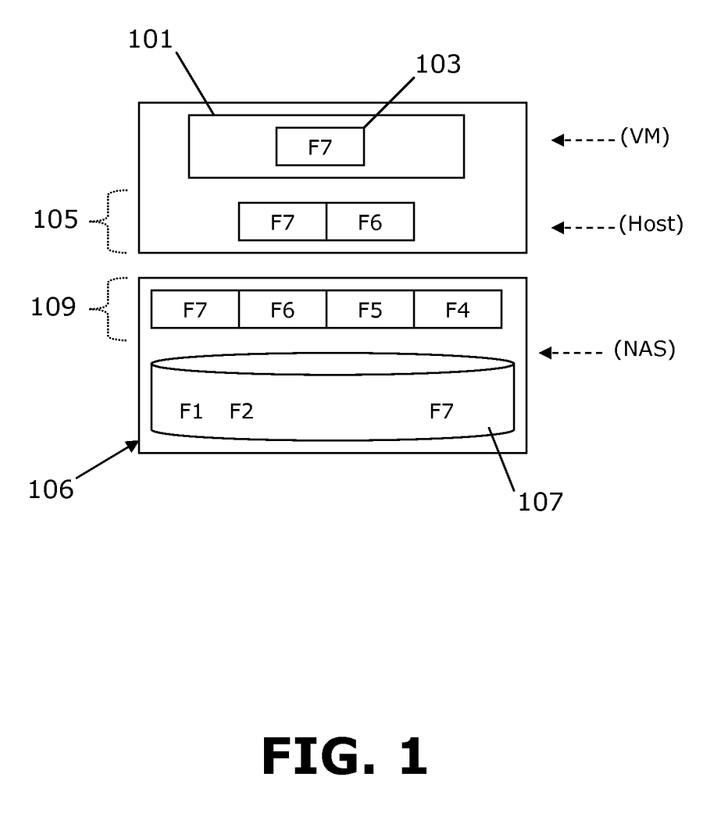
FIG. 1 schematically illustrates a storage system after a first iteration of conventional cache management.

In accordance with a general background associated with at least one embodiment of the invention, an illustrative problem can involve a three-layer system as schematically illustrated in FIG. 1. This system includes: a VM (virtual machine) 101 with a 1 GB (gigabyte) cache 103, a host 105 which includes an additional 2 GB cache, and a NAS server 106 which includes main storage 107 and a 4 GB cache 109 associated therewith. Consider an application in the VM 101 that has a working set with 7 files (F1, F2 . . . F7), each with a 1 GB size. In the present example, consider that the application iterates 3 times and reads all files in order. FIG. 1 thus schematically illustrates a cache state of the noted arrangement after the $1^{st}$ iteration if each layer independently applies a LRU (least recently used) caching policy, where if the caching space becomes full then there is an eviction of the least recently used file(s) to clear space for an incoming new write. Thus, in such a scenario, there is no communication or coordination between the three layers, and the end result, as shown, is for each layer to have remaining in cache only as many of the most recently used files that can fit in that layer's cache. Thus, cache 103 will only have room for the one most recently used file (F7), cache 105 will only have room for the two most recently used files (F7 and F6), and cache 109 will only have room for the four most recently used files (F7, F6, F5 and F4).

Figure 2:
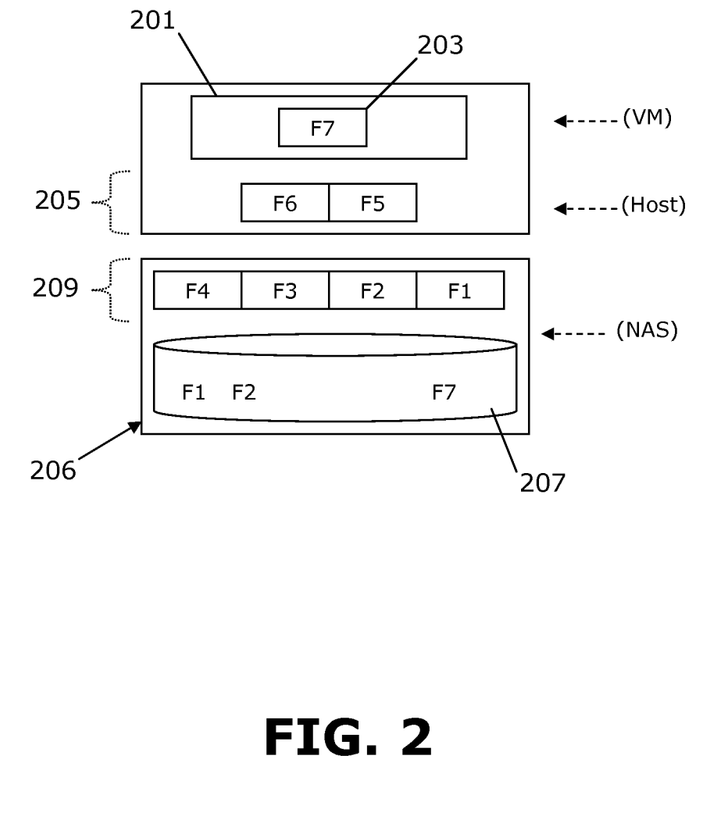
FIG. 2 illustrates essentially the same system of FIG. 1, but showing a hypothetical end result with full caching and no duplication.

However, in accordance with at least one embodiment of the invention, FIG. 2 provides an illustrative view of the same general arrangement (with corresponding reference numerals advanced by 100) where, in a scenario that is much more desirable, the complete working set of files could indeed be cached across storage layers since a sufficient aggregate cache size does exist. Here, and in manner to be better understood and appreciated herebelow, coordination between the layers can ensure that the aggregate caching space (7 GB) is utilized in a manner to accommodate all 7 of the 1 GB files without duplication. Thus, the examples of FIGS. 1 and 2 can help illustrate the inefficiencies that conventional storage arrangements may indeed often present. Other conventional examples, that likewise present great inefficiencies, certainly abound.

In accordance with at least one embodiment of the invention, a solution of singleton, one-way cache management involves several features. To start, each storage layer is numbered via integers in ascending order, starting with 0. Thus, in an illustrative example, a VM file system can be "Layer 0", a host file system can be "Layer 1" and a NAS server file system can be "Layer 2". Layer 0 can be considered a "top" or uppermost layer, while other layers can be considered to be "lower" layers, in concert with ascending numerical order. Each storage layer can include an internal identifier, label or characteristic to allow it to be "aware" of its numerical designation. For example, a time parameter can be mounted for a file system based on the label or characteristic applied thereto. Thus, based on the applied label or characteristic, each storage layer can come to exhibit different caching properties. For instance, by way of an illustrative working example, in accordance with a caching policy that may be employed herein, when data are read for the first time, only the "uppermost" or "top" layer ("Layer 0") will cache such data while other layers will not cache it. As such, other layers will only cache data only when "flushed", or written to by the top layer. As will also be appreciated from the ensuing discussion, other caching behaviors can be determined or prescribed from the layer label.

As such, in accordance with at least one embodiment of the invention, a "dirty bit" can be involved when cache replacement is undertaken, i.e., after initial caching. Particularly, during cache replacement, when a block or page is selected for replacement and does not have a "dirty bit" set, then that block is simply removed (that is, it is not flushed to "lower" storage layers). To accomplish this, every storage layer save for the last will ignore the dirty bit and flush every "cache replaced" block; the last layer will then avoid writing that block to disk if the dirty bit is not set. Each storage layer can still have a "recent threshold" to avoid flushing or managing old data (e.g., not from a working set of data) and can remove such data directly. Subsequently, every new data write can then be handled by each storage layer in any suitable fashion.

Figure 3:
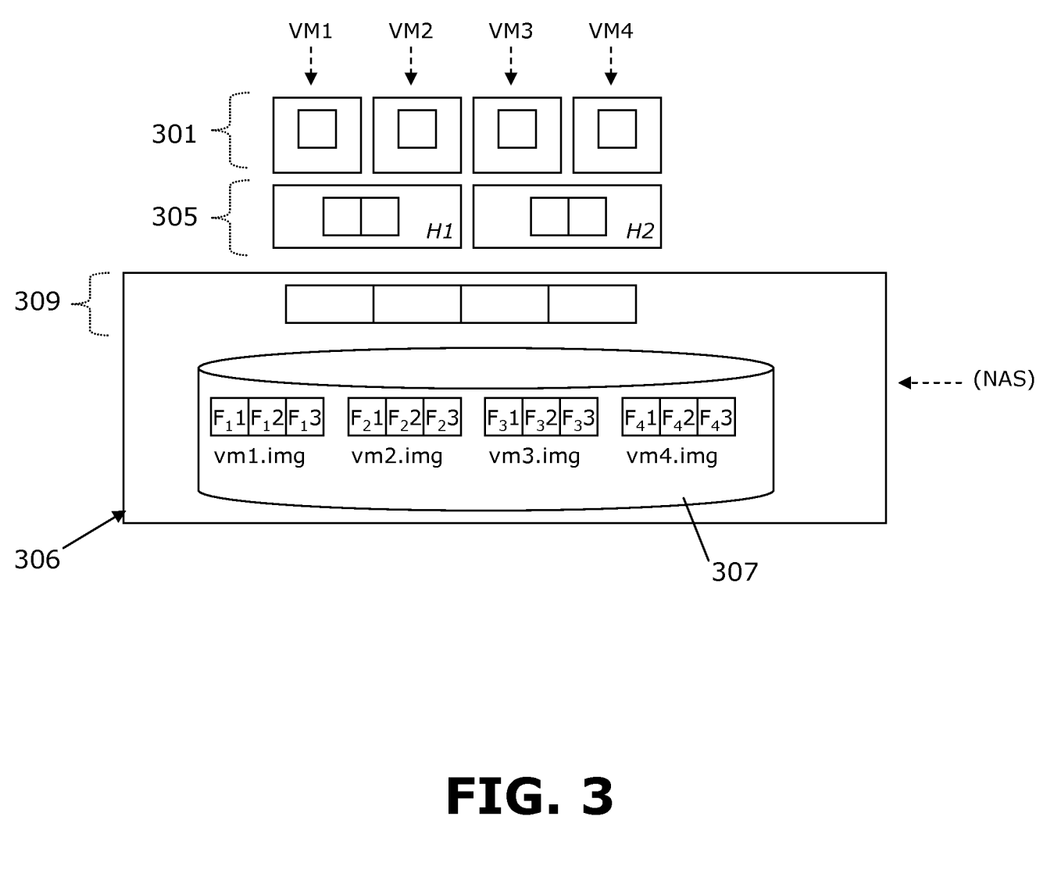
FIG. 3 schematically illustrates a storage system in an initial state.

FIG. 3 illustrates, in accordance with at least one embodiment of the invention, a non-restrictive working example of singleton cache management. As shown here, in an initial state, there are two hosts 305 connected to an NAS server 306 (also labeled H1, H2) and 2 VMs hosted within each physical host; the set of VMs are indicated at 301 and also are labeled VM1 . . . VM4. Each of the VMs 301 includes 1 GB of cache space, each of the hosts 305 includes 2 GB of cache space (in 1 GB blocks) and the NAS server 306 includes main storage 307 and 4 GB of cache space (in 1 GB blocks, indicated at 309). Each of the 1 GB blocks for cache space, at all levels, are indicated by smaller squares or rectangles relative to each level. In an initial state, each VM (301) has an application (vm1.img, vm2.img, vm3.img and vm4.img) residing in NAS main storage 307, each with a working set of 3 files of 1 GB; these files are identified in the drawing as $F_{VMID}\{1,2,3\}$, where VMID is an integer identifying the respective one of the 4 VMs.

Figure 4:
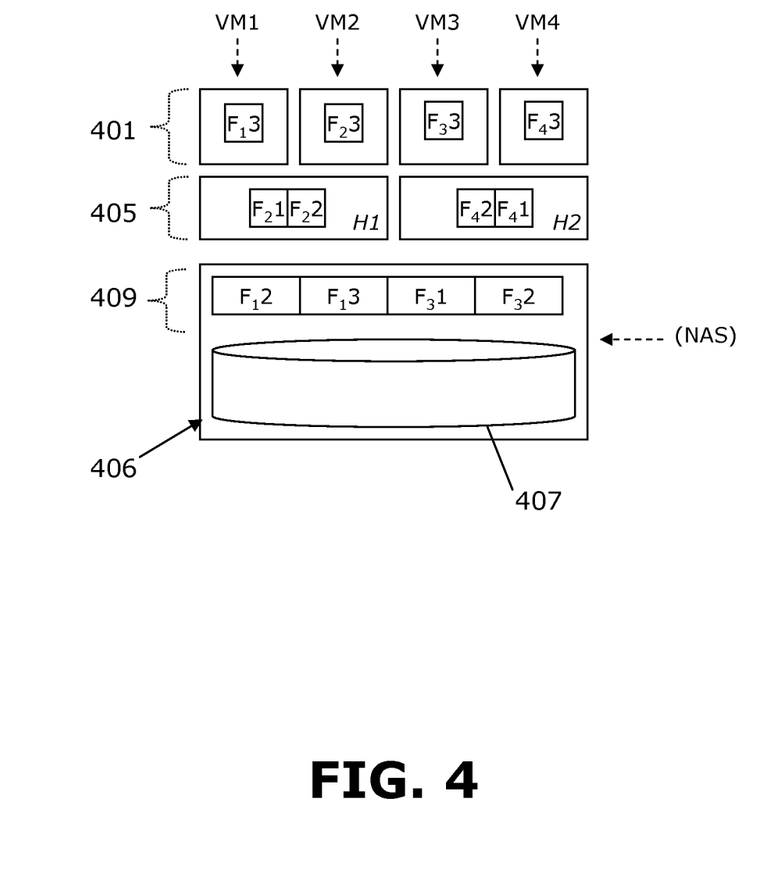
FIG. 4 illustrates essentially the same system of FIG. 3, but with a one-way cache management protocol applied.

If, in accordance with at least one embodiment of the invention, a one-way cache management protocol is applied as broadly contemplated herein, a result as shown in FIG. 4 can be achieved (with corresponding reference numerals advanced by 100). Thus, application data for all 4 VMs (including all three files for each) (401) are cached somewhere among one of the storage layers, without any duplication of data across the layers. In contrast, it can be appreciated that a conventional caching protocol will characteristically result in writes to cache with frequent evictions and excessive duplication, e.g., if each layer has an independent caching policy that is not coordinated with other layers and involves LRU-based eviction. Thus, assuming each VM 401 reads its own files from disk (i.e., NAS main storage 407) in turn and then seeks to cache, a plausible end result in such a conventional scenario is duplication of files ($F_41$, $F_42$, $F_43$, $F_33$) throughout all storage layers, all data of VM2 and VM4 being present somewhere in cache, with some data of VM1 and VM3 not being cached and thus requiring disk access. Clearly, this would represent a highly inefficient use of the available caching space.

Figure 5:
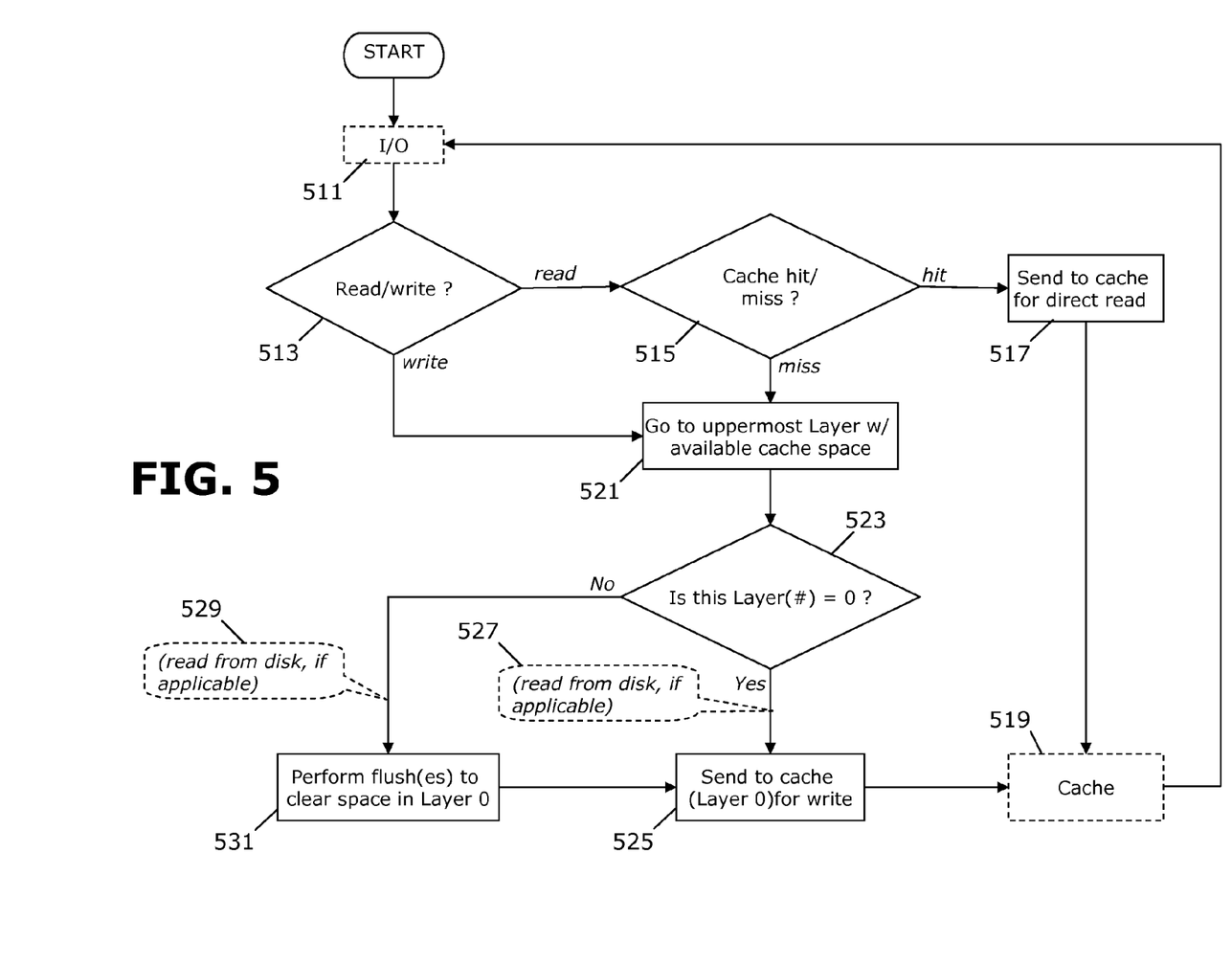
FIG. 5 schematically illustrates steps of a one-way caching protocol.

FIG. 5 schematically illustrates steps of a singleton, one-way caching protocol in accordance with at least one embodiment of the invention. As shown, starting with I/O 511, a determination is made (513) of a read or write instruction (e.g., a write to disk that can then end up with a write to cache). A read instruction will prompt a determination (515) of a cache hit or miss. If there is a determination of a cache hit, then the read request is sent (517) to cache 519 for a direct read, and the process starts anew. If there is a determination of a cache miss, or upon an original write request, the uppermost layer with available cache space (521) is assessed (523). If that uppermost available layer is Layer 0 (i.e., the very uppermost layer as discussed and explained further above) then, if a write request is involved, a write is made to Layer 0 (525); if a read request is involved, then a read is made from disk (e.g., from a NAS file server as discussed further above) (527) and a write is made to Layer 0 (525).

In accordance with at least one embodiment of the invention, if assessment 523 indicates that the uppermost layer with available cache space is not Layer 0, then one or more flushes are performed to clear cache space in Layer 0. As in the other path discussed above, here a read is made from disk (529) if a read request was originally involved. Whether a read or write request, a write is then made to Layer 0 with the interposition of one or more flushing steps (531). Particularly, and to such an end, if sufficient cache space is available in Layer 1, then cache content is migrated ("flushed", 531) from Layer 0 to Layer 1 to accommodate an incoming write to Layer 0 (525). If sufficient cache space is not available in Layer 1, then flush step 531 can be a cascading process where the least recently used cache content in a Layer N (where N>0) is migrated to Layer (N+1), where (N+1) is the lowermost layer with cache space available to accommodate such a migration. If N>1, then space is then cleared in Layer N−1 via migrating least recently used cache content to Layer N as a secondary flush. Flushes from any given layer can then continue, from an upper layer to a lower layer, until sufficient space indeed is cleared in Layer 1 to accommodate a migration of cache content from Layer 0, and thus permit the new write to Layer 0 itself (525).

In accordance with at least one embodiment of the invention, and in stark contrast to conventional arrangements, an eviction of cache content only occurs if, through all Layers which are in coordination with one another such as in a manner as described hereinabove, no free cache space exists and some space indeed has to be cleared. To this end, an extra step can be involved of deleting, from the aggregate of all cache space through the Layers, the least recently used content; thus, this likely will occur from the lowermost Layer. This then can create sufficient available cache space to perform the one or more flushes as described hereabove, to ultimately clear space for a write to Layer 0. On the other hand, it can be appreciated that such scrubbing is likely to occur more frequently in conventional arrangements where there is no coordination between layers, i.e., incoming writes may refer to all layers in view of their independent caching policies and a likelihood that all will cache new write requests. In such an eventuality, evictions from each layer can be frequent, as appreciated herein with the example of FIG. 1, and the discussion herein of FIGS. 3 and 4.

As noted above, in accordance with at least one embodiment of the invention, a dirty bit can be set to ensure that caching does take place. Otherwise, with the dirty bit not set, such content can simply avoid being written in the first place (e.g., if cache space through all layers is already full, thus avoiding eviction of content already in cache), or can be written to the lowermost layer with available cache space. This content with the non-set dirty bit can then be among the first content to be evicted; for instance, a two-level LRU eviction policy can be applied, where the least recently used cache content with a non-set dirty bit is first evicted, followed by the next least recently used content with a non-set dirty bit, and so on, until all content with a non-set dirty bit has been evicted. At that point, the least recently used cache content with a set dirty bit is the next to be evicted.

Figure 6:
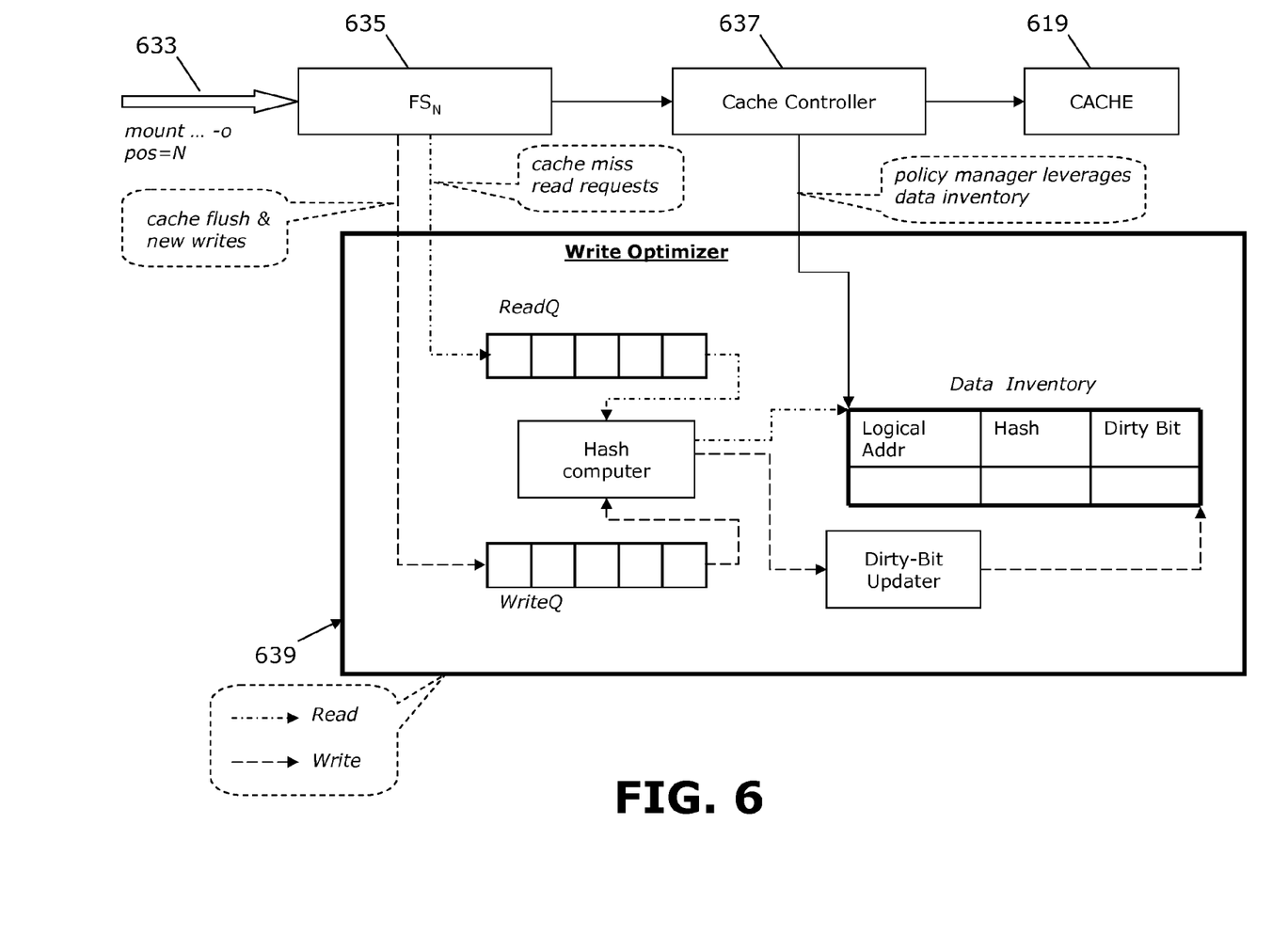
FIG. 6 schematically illustrates a file system for employing a one-way caching protocol.

FIG. 6 schematically illustrates a file system arrangement which can be employed in accordance with embodiments of the invention, e.g., in accordance with the process shown in FIG. 5, relative to any given level ($FS_N$). As shown, an initial read or write request is referred to a given file system (FS) 635 of level N. Included at that level are a cache controller 637 and cache 619, as well as a write optimizer 639. Read requests involving a cache miss are referred to a read queue in write optimizer 639, while cache flushes and new writes (to cache) are referred to a write queue in write optimizer 639. In both cases a hash computer will update a data inventory, but in the case of cash flush and new writes the dirty bit (as discussed hereabove) is also updated. The cache controller 637 leverages the data inventory as writes are then made to cache 619.

It can be appreciated from the foregoing that, in accordance with at least one embodiment of invention, a technical improvement is represented via provision of a singleton, one-way cache management protocol in hierarchical virtualized storage systems, involving positioning and/or labeling each storage component in the stacked system, and making each component aware of its position wherein, based on its position, each storage component can then implement its own cache entry/exit policy, and this policy may be different from those of other storage components.

In accordance with at least one embodiment of the invention, very generally, quantitative values as determined herein, or other data or information as used or created herein, can be stored in memory or displayed to a user on a screen, as might fit the needs of one or more users.

Figure 7:
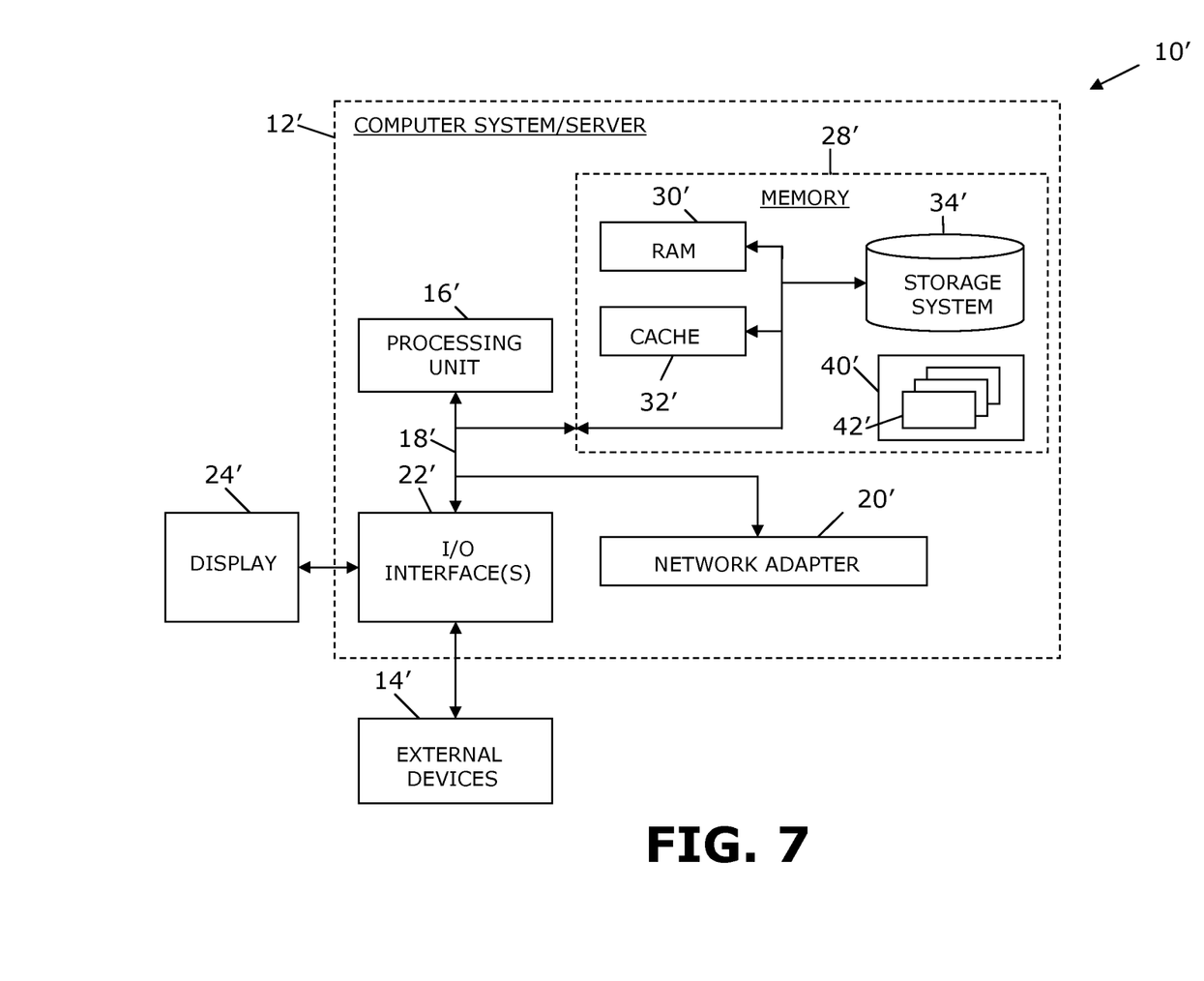
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing cache management in a hierarchical virtualized storage system with a plurality of layers each comprising caching space, said method comprising:

utilizing at least one processor to execute computer code configured to perform the steps of:

for each layer in the storage system, designating a relative position with respect to at least one other layer in the storage system, wherein each layer in the storage system corresponds to cache memory of a file system different from a file system of another layer;

imparting a caching policy to be applied collectively to all layers, the caching policy being based on the relative position of each layer with respect to at least one other layer in the storage system, wherein said imparting of a caching policy provides for caching data solely at a first layer upon a request to cache data, the first layer comprising an uppermost layer relative to other layers; and upon an attempt to cache data in at least one of the layers, maintaining communication between the layers to permit application of the caching policy.

2. The method according to claim 1, wherein said imparting of a caching policy provides for flushing cached data to a second layer if sufficient caching space relative to the cache request is unavailable in the first layer.

3. The method according to claim 2, wherein said imparting of a caching policy provides for caching data in the first layer upon said flushing.

4. The method according to claim 2, wherein the first layer comprises a virtual machine layer.

5. The method according to claim 4, wherein the second layer comprises a host layer.

6. The method according to claim 2, wherein said imparting of a caching policy provides for attempting a cache write to a lowermost layer with available caching space upon detection of a non-set dirty bit.

7. The method according to claim 6, wherein said imparting of a caching policy provides for applying an eviction policy across all layers, wherein the eviction policy favors removing data with a non-set dirty bit.

8. The method according to claim 1, wherein said imparting of a caching policy provides for applying a least recently used caching eviction policy with respect to a totality of caching space across all storage layers.

9. An apparatus for providing cache management in a hierarchical virtualized storage system, said apparatus comprising:

at least one processor; and a computer readable storage medium having computer readable program code embodied therewith and executable by the at least one processor, the computer readable program code comprising:

computer readable program code configured, for each layer in the storage system, to designate a relative position with respect to at least one other layer in the storage system, wherein each layer in the storage system corresponds to cache memory of a file system different from a file system of another layer;

computer readable program code configured to impart a caching policy to be applied collectively to all layers, the caching policy being based on the relative position of each layer with respect to at least one other layer in the storage system, wherein the imparting of a caching policy provides for caching data solely at a first layer upon a request to cache data, the first layer comprising an uppermost layer relative to other layers; and computer readable program code configured, upon an attempt to cache data in at least one of the layers, to maintain communication between the layers to permit application of the caching policy.

10. A computer program product for providing cache management in a hierarchical virtualized storage system, said computer program product comprising:

a computer readable storage medium having computer readable program code embodied therewith, the computer readable program code comprising:

computer readable program code configured, for each layer in the storage system, to designate a relative position with respect to at least one other layer in the storage system, wherein each layer in the storage system corresponds to cache memory of a file system different from a file system of another layer;

computer readable program code configured to impart a caching policy to be applied collectively to all layers, the caching policy being based on the relative position of each layer with respect to at least one other layer in the storage system, wherein the imparting of a caching policy provides for caching data solely at a first layer upon a request to cache data, the first layer comprising an uppermost layer relative to other layers; and computer readable program code configured, upon an attempt to cache data in at least one of the layers, to maintain communication between the layers to permit application of the caching policy.

11. The computer program product according to claim 10, wherein the imparting of a caching policy provides for flushing cached data to a second layer if sufficient caching space relative to the cache request is unavailable in the first layer.

12. The computer program product according to claim 11, wherein the imparting of a caching policy provides for caching data in the first layer upon said flushing.

13. The computer program product according to claim 11, wherein the first layer comprises a virtual machine layer.

14. The computer program product according to claim 13, wherein the second layer comprises a host layer.

15. The computer program product according to claim 11, wherein the imparting of a caching policy provides for attempting a cache write to a lowermost layer with available caching space upon detection of a non-set dirty bit.

16. The computer program product according to claim 15, wherein the imparting of a caching policy provides for applying an eviction policy across all layers, wherein the eviction policy favors removing data with a non-set dirty bit.

17. The computer program product according to claim 10, wherein the imparting of a caching policy provides for applying a least recently used caching eviction policy with respect to a totality of caching space across all storage layers.

18. A method comprising:

for each layer in a hierarchical virtualized storage system storage system, designating a relative position with respect to at least one other layer in the storage system, wherein each layer in the storage system corresponds to cache memory of a file system different from a file system of another layer;

imparting a caching policy to be applied collectively to all layers, the caching policy being based on the relative position of each layer with respect to at least one other layer in the storage system; and upon an attempt to cache data in at least one of the layers, maintaining communication between the layers to permit application of the caching policy;

said imparting of a caching policy comprising:

providing for caching data solely at a first layer upon a request to cache data, the first layer comprising a virtual machine layer, and an uppermost layer relative to other layers; and providing for applying a least recently used caching eviction policy with respect to a totality of caching space across all storage layers.

\* \* \* \* \*